Dec. 7, 1937.    G. WAALKES    2,101,353
CONVEYER MECHANISM
Filed March 25, 1936
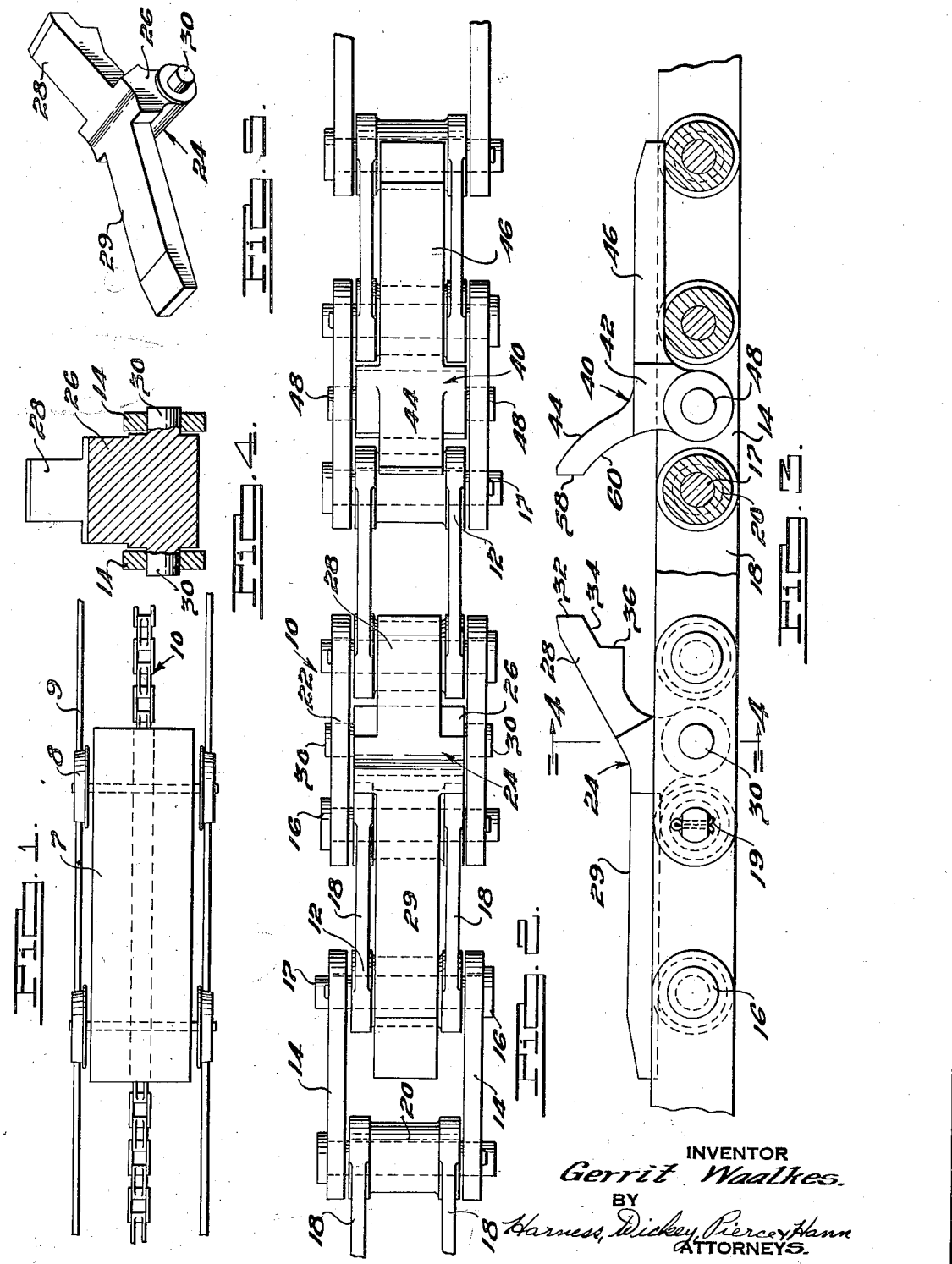
INVENTOR
*Gerrit Waalkes.*
BY
*Harness, Dickey, Pierce & Hann*
ATTORNEYS.

Patented Dec. 7, 1937

2,101,353

UNITED STATES PATENT OFFICE 2,101,353

CONVEYER MECHANISM

Gerrit Waalkes, Highland Park, Mich., assignor to Anchor Steel and Conveyor Company, a corporation of Michigan Application March 25, 1936, Serial No. 70,755

1 Claim. (Cl. 104—172)

This invention relates to a conveying mechanism and more particularly relates to that type of conveying mechanism in which a conveyer chain is used and upon which dogs are mounted for conveying trucks or other objects along tracks.

Objects of the invention are to provide a conveyer chain made up of parts economical to manufacture and so constructed that these parts may be readily and easily assembled to provide a durable and rugged conveying unit; to provide dogs of a simplified structure so that they may be conveniently mounted on the conveyer chains; to provide mountings on the conveyer chain for the dogs of such a nature that special and complicated structures of the elements of the conveyer chain are not necessary to provide a mounting means for dogs and the dogs may be easily mounted on the known types of chains by a relatively simple modification of these known chains; and to provide a driving dog of such a structure that positive driving will result without causing distortion or displacement of the chain out of its true line of travel.

Other objects of the invention will become apparent from the following specification, the drawing relating thereto and the claim hereinafter set forth.

In the drawing in which like numerals are used to designate like parts in the several views:

Figure 1 is a plan view diagrammatically illustrating one use of the invention;

Fig. 2 is a partial plan view of the conveying mechanism illustrating the invention;

Fig. 3 is a partially broken, partially sectioned enlarged side view of the conveying mechanism shown in Fig. 2;

Fig. 4 is an elevational view, partly in section, taken along the line 4—4 of Fig. 3;

Fig. 5 is a perspective view of the driving dog shown in the preceding views.

Conveying mechanisms of the type to which this invention relates are commonly employed in connection with production lines. In such production lines it is common practice to provide a pair of spaced parallel tracks upon which articles are conveyed usually by a continuous movement and are usually worked upon during their passage along the tracks. As an example, in automobile factories the automobile chassis are carried and guided by such tracks while the conveyer is employed as a source of propulsion. Automobile bodies are usually placed on trucks, the wheels of which are received and guided by the rails and the truck cooperates with the conveyer chain so as to be driven thereby. Usually the conveyer chain consists of a single chain of the double link type, which is located midway between the tracks and to which driving dogs are secured at spaced intervals along its length. The driving dogs are so constructed and arranged as to engage a contact surface of the truck or other object intended to be conveyed along the tracks and to move it therewith.

In order to prevent the article being conveyed from advancing at a greater rate than the rate of speed of the conveyer chain when the tracks are inclined downwardly in the direction of travel, a so-called back-up dog is conventionally employed in connection with each of the driving dogs. These back-up dogs are placed a short distance in advance of the driving dogs and are so constructed that when a driving dog engages an object being conveyed when moving towards the object in the direction of desired travel it will trip to allow the object or contact portion thereof to pass over it to a position to engage the succeeding driving dog and thereafter is operative to prevent undesired forward movement of the conveyed object relative to the conveyer chain.

In the past such driving and back-up dogs have been mounted on the chains by providing specially constructed chain links for their reception and support. As a result of the necessity of furnishing such special links the cost of the conveyer chains has been materially greater than the cost of such chains not equipped with such special links. Additionally it has been necessary to maintain the supply of such special links on hand which in and of itself increases the cost of such devices.

In accordance with the present invention the above described type of conveying mechanism is provided without the necessity of the employment of such special links as above referred to. In other words, in accordance with the present invention when it is desired to mount a dog upon a conveyer chain all that is required is to drill the pair of opposing links at each point that it is desired to mount a dog; and the dogs are so constructed and arranged as to be pivotally received in, and supported during driving by reception of a portion thereof in such drilled holes. In this manner the same type of linkage may be used throughout the conveyer chain and dogs may be mounted at any desired or convenient point in the link of the chain simply by drilling the cooperating links. As a result conveyer chains constructed in accordance with the invention cost no more than conventional chains not equipped with driving dogs and the same links may be employed in service regardless of whether they cooperate with a dog or not.

Figure 1 diagrammatically illustrates one use of the present invention in which a truck 7 with wheels 8 is shown as positioned on tracks 9 and is moved along the track by means of a conveying chain 10. The conveying chain 10 is provided with driving and back-up dogs which contact the truck and move it along the track and hold it in its proper position along the line, respectively.

This will be better understood by reference to Figs. 2 to 5 of the drawing in which a conveyer chain generally indicated at 10 and preferably of the continuous type comprises a plurality of alternate inner links 12 pivotally connected to each other by outer links 14 which overlap the inner links at their outer ends and are pivoted thereto by means of pivot pins 16, or the like, which have heads abutting against the outer surface of the outer links 14 and shanks 17 extending through apertures in the overlapping portion of the links 12 and 14 to pivotally mount these links to each other.

In more detail the inner links 12 comprise two upstanding spaced side members 18 which are connected at their ends by hubs 20 integral with the side members 18 and having openings therethrough. Independently formed outer links 14 are provided with openings at their ends which overlie the openings in the hubs 20 when the links are assembled and through both of which the shanks 17 of the pins 16 pass to pivotally mount the links in respect to each other. Cotter pins 19 or other suitable locking means may pass through apertures in the ends of the shanks 17 to prevent their endwise displacement.

To provide mounting means for the driving and back-up dogs at suitable spaces along the chain outer links 12 are provided with apertures 22 substantially at their centers. Since such apertures are formed by a simple drilling operation it can be seen that mounting means for the dogs may be easily provided anywhere along the conveyer.

The driving dog 24 comprises a base or pivot portion 26 which extends transversely of and is integral with an upstanding forward extension portion 28 and a horizontal balancing portion 29, the latter portion extending to the side of the pivot portion 26 opposite to that of the extension 28. The base 26 is provided adjacent its bottom on each of its sides with projections in the form of pins 30, or the like, which are adapted to enter the openings 22 in the outer links 14 to pivotally mount the dogs thereon when the parts are assembled.

When in assembled and operative position with the conveyer chain the driving dog will contact a part of the truck 7 or other article which is being pushed at the front face 32 of the dog or on the under-surface of the extension member 28 indicated at 34. If the contact is along the surface as indicated at 34 there may be a tendency for the contact member on the article being pushed to ride down along the under-surface of the extension 28 thereby tending to lift the entire chain upwardly causing displacement or deviation of the chain out of its true line of travel. This would, of course, be objectionable and to prevent it a stop indicated at 36 is formed integral with the extension 28 on its under-face and extends transversely the width of the extension 28.

The portion 29 which is rearwardly of the pivot pin 30 is of such length and weight that it over-balances the forward extension 28 and maintains it in its upright position when the conveyer chain is operated. The relative proportions and positions of the elements of the conveyer chain may be seen best in Fig. 2, and from the drawing it can be seen that the transverse width of the base 26 is substantially the same as the width between the outside surfaces of the inner links 12 and is slightly less in width than the distance between the inner surfaces of the outer links 14. The dog is mounted between the outer links 14 by its pivot pins 30 which pass through the apertures 22 in the links 14 intermediate the points of connection of the inner and outer links with each other. Beside the advantages outlined above with so mounting the dog, another advantage which is obtained by this mounting is that this permits the base 26 to be of substantially the same width as the inner links 12 and a well balanced and rugged unit is thereby produced.

The extensions 28 and 29 are of substantially less width than the base 26 and are of a width slightly less than the distance between the inner sides of the links 12 so that they may rest between these inner links. The hubs are of such diameter that they will provide seats for the rear extension 29 in a horizontal plane and insure proper positioning of the upstanding elements 28.

In order to prevent the articles being pushed from moving away from the driving dog, a back-up dog 40 is provided which is mounted with the conveyer links in substantially the same way as the driving dog but in opposed relation thereto. The back-up dog 40 is of substantially the same structure as the driving dog, having a base or pivot portion 42, an upstanding portion 44 extending to one side of the pivot portion and an over-balancing portion 46 extending to the opposite side of the pivot portion. As in the case of the driving dog, the base portion 42 is provided near its bottom with pivot pins 48 or the like which are adapted to fit into the apertures 22 in the outer links 14. The extensions 44 and 46 are of a width so that they may seat between the sides 18 on the inner link 12 and the counter-balancing portion 46 rests upon the hub 20 when the dog is in an operative position.

The driving dog and back-up dog are spaced from each other in pairs so that the upstanding portions 28 and 44 extend toward and face each other and any tendency of a truck or other article being pushed along its track to move away from the driving dog would be prevented by a contact part of the article striking against either the base 58 or the under-side 60 of the member 44. If, however, the chain is moving toward an object which it is desired to convey along the tracks and a back-up dog first contacts the object, the object in striking the extension 44 of the back up dog will cause the dog to rotate about its pivotal axis and permit the dog to pass under the object, thereby bringing the succeeding driving dog into driving relation to the object and permit the back-up dog to re-assume its normal operative position.

Formal changes may be made in the specific embodiment of the invention described without departing from the spirit and substance of the invention, the scope of which is commensurate with the appended claim.

What I claim is:

In a conveying mechanism, a conveyer chain having alternate inner links connected to outer links pivotally connected to the outer sides of the inner links at their ends, said inner links being similar in shape to each other, said outer links being similar in shape to each other, and a driving dog mounted between the sides of the outer links, said outer links having openings therethrough substantially at their centers intermediate the points of connection of said outer links with said alternate inner links, said dog having a pivot portion extending transversely of the conveyer chain and being of a width slightly less than the distance between the inner sides of the outer links and having pivot pins extending through said center openings of said outer links.

GERRIT WAALKES.